United States Patent
Wang et al.

(10) Patent No.: US 10,264,577 B2
(45) Date of Patent: Apr. 16, 2019

(54) COMMUNICATIONS DEVICE AND DISCONTINUOUS TRANSMISSION METHOD

(71) Applicant: Huawei Technologies Co., Ltd., Shenzhen (CN)

(72) Inventors: Fan Wang, Shanghai (CN); Wenying Xu, Shenzhen (CN); Xiaoxiao Zheng, Shanghai (CN)

(*) Notice: Subject to any disclaimer, the term of this patent is extended or adjusted under 35 U.S.C. 154(b) by 0 days.

(21) Appl. No.: 15/467,704

(22) Filed: Mar. 23, 2017

(65) Prior Publication Data

US 2017/0196008 A1 Jul. 6, 2017

Related U.S. Application Data

(63) Continuation of application No. PCT/CN2014/087323, filed on Sep. 24, 2014.

(51) Int. Cl.
*H04W 72/04* (2009.01)
*H04W 76/28* (2018.01)
*H04W 52/02* (2009.01)

(52) U.S. Cl.
CPC ... *H04W 72/0446* (2013.01); *H04W 52/0216* (2013.01); *H04W 76/28* (2018.02);
(Continued)

(58) Field of Classification Search
CPC .................. H04W 72/0446; H04W 76/048
See application file for complete search history.

(56) References Cited

U.S. PATENT DOCUMENTS 7,512,094 B1 3/2009 Linebarger et al.
9,769,798 B2* 9/2017 Yu .................. H04W 76/27
(Continued)

FOREIGN PATENT DOCUMENTS

CN 1383635 A 12/2002
CN 101030809 A 9/2007
(Continued)

OTHER PUBLICATIONS

3rd Generation Partnership Project; Technical Specification Group Radio Access Network; Physical Layer Procedures (FDD) (Release 11), 3GPP TS 25.214 V11.10.0 (Sep. 2014), 128 pages.
(Continued)

*Primary Examiner* — Parth Patel
(74) *Attorney, Agent, or Firm* — Slater Matsil, LLP (57) ABSTRACT

The embodiments provide a communications device and a discontinuous transmission method, The communications device includes: a first determining module, configured to: when a dedicated channel DCH carries a signaling radio bearer SRB, determine a position in which a current timeslot is located in a transmission interval of the SRB, where the transmission interval of the SRB is greater than or equal to 40 ms, The communications device also includes a second determining module, configured to: when the position in which the current timeslot is located meets a preset condition, and a radio frame in which the current timeslot is located does not include the SRB or a DPCH transport block, determine not to send or not to receive a dedicated physical control channel DPCCH and/or a dedicated physical data channel DPDCH in the current timeslot.

20 Claims, 3 Drawing Sheets

(52) U.S. Cl.
CPC ......... *H04W 52/0261* (2013.01); *Y02D 70/00* (2018.01); *Y02D 70/1222* (2018.01); *Y02D 70/1224* (2018.01); *Y02D 70/1242* (2018.01); *Y02D 70/1262* (2018.01); *Y02D 70/146* (2018.01); *Y02D 70/24* (2018.01); *Y02D 70/25* (2018.01)

(56) References Cited

U.S. PATENT DOCUMENTS

| | | | |
|---|---|---|---|
| 2002/0082020 A1 | 6/2002 | Lee et al. | |
| 2005/0281222 A1* | 12/2005 | Ranta-Aho | H04W 76/028 370/328 |
| 2006/0023629 A1* | 2/2006 | Kim | H04W 72/1284 370/235 |
| 2006/0120404 A1* | 6/2006 | Sebire | H04L 1/1812 370/469 |
| 2006/0256757 A1* | 11/2006 | Kuusela | H04W 76/28 370/335 |
| 2007/0030828 A1* | 2/2007 | Vimpari | H04W 72/1284 370/335 |
| 2007/0030829 A1* | 2/2007 | Vimpari | H04L 5/0051 370/335 |
| 2007/0030838 A1* | 2/2007 | Kaikkonen | H04W 52/325 370/342 |
| 2007/0030839 A1* | 2/2007 | Vimpari | H04W 28/06 370/342 |
| 2007/0189237 A1* | 8/2007 | Jaatinen | H04B 7/2656 370/335 |
| 2007/0286155 A1* | 12/2007 | Kaikkonen | H04W 52/221 370/350 |
| 2008/0043681 A1* | 2/2008 | Vimpari | H04B 7/2656 370/335 |
| 2008/0049710 A1* | 2/2008 | Zeira | H04W 52/08 370/345 |
| 2008/0112467 A1* | 5/2008 | Shellhammer | H04B 1/46 375/143 |
| 2008/0220787 A1* | 9/2008 | Stanwood | H04B 7/02 455/450 |
| 2008/0261530 A1* | 10/2008 | Gerstenberger | H04W 52/0219 455/63.1 |
| 2009/0086682 A1* | 4/2009 | Kazmi | H04W 52/146 370/335 |
| 2009/0203376 A1* | 8/2009 | Sambhwani | H04J 11/0069 455/434 |
| 2009/0221293 A1* | 9/2009 | Petrovic | H04W 48/10 455/450 |
| 2009/0303977 A1* | 12/2009 | Hsu | H04L 1/0007 370/345 |
| 2010/0220606 A1* | 9/2010 | Niwano | H04W 52/54 370/252 |
| 2010/0273520 A1* | 10/2010 | Pelletier | H04L 5/0007 455/522 |
| 2011/0134757 A1* | 6/2011 | Lin | H04W 72/085 370/241 |
| 2012/0008510 A1* | 1/2012 | Cai | H04B 7/0404 370/252 |
| 2012/0113825 A1* | 5/2012 | Baglin | H04W 24/00 370/252 |
| 2012/0163192 A1* | 6/2012 | Bae | H04W 76/18 370/242 |
| 2013/0148579 A1* | 6/2013 | Das | H04W 28/20 370/328 |
| 2013/0208668 A1* | 8/2013 | Ramos | H04W 76/36 370/329 |
| 2013/0329563 A1* | 12/2013 | Song | H04W 24/02 370/241 |
| 2013/0343351 A1* | 12/2013 | Sambhwani | H04B 7/2618 370/336 |
| 2014/0080503 A1* | 3/2014 | Issakov | H04W 24/00 455/456.1 |
| 2014/0082447 A1* | 3/2014 | Kanamarlapudi | H04L 1/08 714/748 |
| 2014/0105187 A1* | 4/2014 | Das | H04W 28/22 370/336 |
| 2014/0348010 A1* | 11/2014 | Kanamarlapudi | H04L 43/0847 370/252 |
| 2014/0369247 A1* | 12/2014 | Sambhwani | H04W 76/28 370/311 |
| 2015/0094113 A1* | 4/2015 | Li | H04W 52/20 455/522 |
| 2015/0131626 A1* | 5/2015 | Tsai | H04L 5/0055 370/336 |
| 2015/0215903 A1* | 7/2015 | Zhao | H04W 72/04 370/329 |
| 2015/0271816 A1* | 9/2015 | Akkarakaran | H04W 72/0446 370/336 |
| 2015/0271869 A1* | 9/2015 | Akkarakaran | H04W 52/0216 370/329 |
| 2015/0289266 A1* | 10/2015 | Hsu | H04W 72/0446 370/329 |
| 2015/0373736 A1* | 12/2015 | Ji | H04B 7/2621 370/330 |
| 2017/0150483 A1* | 5/2017 | Zhang | H04W 72/042 |
| 2017/0302491 A1* | 10/2017 | Yang | H04L 27/2649 |

FOREIGN PATENT DOCUMENTS

| | | |
|---|---|---|
| CN | 101179825 A | 5/2008 |
| CN | 102740422 A | 10/2012 |
| EP | 2645808 A1 | 10/2013 |
| RU | 2305371 C2 | 8/2007 |
| RU | 2414050 C2 | 3/2011 |
| WO | 2012078565 A1 | 6/2012 |
| WO | 2013106471 A1 | 7/2013 |

OTHER PUBLICATIONS

Qualcomm Incorporated, "Improved DCH reliability with SRB transmission," 3GPP TSG RAN WG1 Meeting #78, R1-143325, Dresden, Germany, Aug. 18-22, 2014, 6 pages.

* cited by examiner

COMMUNICATIONS DEVICE AND DISCONTINUOUS TRANSMISSION METHOD

CROSS-REFERENCE TO RELATED APPLICATIONS

This application is a continuation of International Patent Application No. PCT/CN2014/087323, filed on Sep. 24, 2014. The disclosure of the aforementioned application is hereby incorporated by reference in the entirety.

TECHNICAL FIELD

The present invention relates to the communications field, and in particular, to a communications device and a discontinuous transmission method.

BACKGROUND

A signaling radio bearer (SRB) is used to carry transmission signaling of a radio link. Transmission reliability of the SRB is very important to link quality of the radio link, user experience, and the like. Because a dedicated channel (DCH) supports a longer transmission interval for transmitting the SRB, for example, 40 ms, and the dedicated channel has a soft handover function, so that better radio transmission reliability can be maintained when the SRB is transmitted on the DCH. When the SRB is configured to be transmitted on the DCH, and when there is an SRB being transmitted on the DCH, UE transmits a dedicated physical control channel (DPCCH) and a dedicated physical data channel (DPDCH) in each timeslot; when there is no SRB being transmitted on the DCH, UE still transmits a DPCCH or a DPDCH (for example, an empty DPDCH or an invalid DPDCH) in each timeslot. That is, transmission of the DPCCH or the DPDCH is continuous, transmission of the SRB is discontinuous, and a probability of transmitting the SRB is low. When no SRB is transmitted on the DCH, the UE still transmits the DPCCH or the DPDCH, which increases power supply overheads consumed by the UE.

SUMMARY

The present invention provides a communications device and a discontinuous transmission method, which can reduce power supply overheads.

According to a first aspect, a communications device is provided. The communications device includes a first determining module, configured to: when a dedicated channel DCH carries a signaling radio bearer SRB, determine a position in which a current timeslot is located in a transmission interval of the SRB, where the transmission interval of the SRB is greater than or equal to 40 ms. The communications device also includes a second determining module, configured to: in a case in which the position in which the current timeslot is located meets a preset condition, when a radio frame in which the current timeslot is located does not include the SRB or a DPCH transport block, determine not to send or not to receive a dedicated physical control channel DPCCH and/or a dedicated physical data channel DPDCH in the current timeslot.

With reference to the first aspect, in a first possible implementation manner of the first aspect, the first determining module is specifically configured to: when the DCH carries only the SRB, determine the position in which the current timeslot is located in the transmission interval of the SRB.

With reference to the first aspect or the first possible implementation manner of the first aspect, in a second possible implementation manner of the first aspect, that the position in which the current timeslot is located meets a preset condition includes: the current timeslot is not in a first preset time range of the transmission interval of the SRB, where the first preset time range is less than or equal to one radio frame.

With reference to the second possible implementation manner of the first aspect, in a third possible implementation manner of the first aspect, the first preset time range is equal to one radio frame, and the first preset time range is the first radio frame of the transmission interval of the SRB.

With reference to the first aspect or the first possible implementation manner of the first aspect, in a fourth possible implementation manner of the first aspect, that the position in which the current timeslot is located meets a preset condition includes: the current timeslot is in a second preset time range of the transmission interval of the SRB.

With reference to the fourth possible implementation manner of the first aspect, in a fifth possible implementation manner of the first aspect, the second preset time range is the third radio frame of the transmission interval of the SRB.

With reference to the first aspect or any possible implementation manner of the first to fifth possible implementation manners of the first aspect, in a sixth possible implementation manner of the first aspect, the communications device is user equipment; and the second determining module is specifically configured to: when the radio frame in which the current timeslot is located does not include the SRB or the DPCH transport block, determine not to send, in uplink, or not to receive, in downlink, the DPDCH and/or the DPCCH in the current timeslot.

With reference to the sixth possible implementation manner of the first aspect, in a seventh possible implementation manner of the first aspect, the communications device further includes a setting module, configured to: when the second determining module determines not to send, in uplink, the DPDCH and/or the DPCCH in the current timeslot, set a parameter UL_DPCH_DYN_DTX to TRUE in the current timeslot; or when the second determining module determines not to receive, in downlink, the DPDCH and/or the DPCCH in the current timeslot, set a parameter DL_DPCH_DYN_DRX to TRUE in the current timeslot.

With reference to the first aspect or any possible implementation manner of the first to fifth possible implementation manners of the first aspect, in an eighth possible implementation manner of the first aspect, the communications device is a network device; and the second determining module is specifically configured to: when the radio frame in which the current timeslot is located does not include the SRB or the DPCH transport block, determine not to send, in downlink, or not to receive, in uplink, the DPDCH and/or the DPCCH in the current timeslot.

With reference to the eighth possible implementation manner of the first aspect, in a ninth possible implementation manner of the first aspect, the communications device further includes a setting module, configured to: when the second determining module determines not to send, in downlink, the DPDCH and/or the DPCCH in the current timeslot, set a parameter DL_DPCH_DYN_DRX to TRUE in the current timeslot; or when the second determining module determines not to receive, in uplink, the DPDCH and/or the DPCCH in the current timeslot, set a parameter UL_DPCH_DYN_DTX to TRUE in the current timeslot.

According to a second aspect, a discontinuous transmission method is provided. The method includes: determining a position in which a current timeslot is located in a transmission interval of an SRB when a dedicated channel DCH carries the signaling radio bearer SRB, where the transmission interval of the SRB is greater than or equal to 40 ms; and in a case in which the position in which the current timeslot is located meets a preset condition, determining, when a radio frame in which the current timeslot is located does not include the SRB or a DPCH transport block, not to send or not to receive a dedicated physical control channel DPCCH and/or a dedicated physical data channel DPDCH in the current timeslot.

With reference to the second aspect, in a first possible implementation manner of the second aspect, the determining a position in which a current timeslot is located in a transmission interval of an SRB when a DCH carries the SRB includes: determining the position in which the current timeslot is located in the transmission interval of the SRB when the DCH carries only the SRB.

With reference to the second aspect or the first possible implementation manner of the second aspect, in a second possible implementation manner of the second aspect, that the position in which the current timeslot is located meets a preset condition includes: the current timeslot is not in a first preset time range of the transmission interval of the SRB, where the first preset time range is less than or equal to one radio frame.

With reference to the second possible implementation manner of the second aspect, in a third possible implementation manner of the second aspect, the first preset time range is equal to one radio frame, and the first preset time range is the first radio frame of the transmission interval of the SRB.

With reference to the second aspect or the first possible implementation manner of the second aspect, in a fourth possible implementation manner of the second aspect, that the position in which the current timeslot is located meets a preset condition includes: the current timeslot is in a second preset time range of the transmission interval of the SRB.

With reference to the fourth possible implementation manner of the second aspect, in a fifth possible implementation manner of the second aspect, the second preset time range is the third radio frame of the transmission interval of the SRB.

With reference to the second aspect or any possible implementation manner of the first to fifth possible implementation manners of the second aspect, in a sixth possible implementation manner of the second aspect, the method is performed by user equipment UE, and the determining, when a radio frame in which the current timeslot is located does not include the SRB or a DPCH transport block, not to send or not to receive a DPCCH and/or a DPDCH in the current timeslot includes: determining, when the radio frame in which the current timeslot is located does not include the SRB or the DPCH transport block, not to send, in uplink, or not to receive, in downlink, the DPDCH and/or the DPCCH in the current timeslot.

With reference to the sixth possible implementation manner of the second aspect, in a seventh possible implementation manner of the second aspect, the method further includes: setting UL_DPCH_DYN_DTX to TRUE in the current timeslot when it is determined not to send, in uplink, the DPDCH and/or the DPCCH in the current timeslot; or setting DL_DPCH_DYN_DRX to TRUE in the current timeslot when it is determined not to receive, in downlink, the DPDCH and/or the DPCCH in the current timeslot.

With reference to the second aspect or any possible implementation manner of the first to fifth possible implementation manners of the second aspect, in an eighth possible implementation manner of the second aspect, the method is performed by a network device, and the determining, when a radio frame in which the current timeslot is located does not include the SRB or a DPCH transport block, not to send or not to receive a DPCCH and/or a DPDCH in the current timeslot includes: determining, when the radio frame in which the current timeslot is located does not include the SRB or the DPCH transport block, not to send, in downlink, or not to receive, in uplink, the DPDCH and/or the DPCCH in the current timeslot.

With reference to the eighth possible implementation manner of the second aspect, in a ninth possible implementation manner of the second aspect, the method further includes: setting a parameter DL_DPCH_DYN_DRX to TRUE in the current timeslot when it is determined not to send, in downlink, the DPDCH and/or the DPCCH in the current timeslot; or setting a parameter UL_DPCH_DYN_DTX to TRUE in the current timeslot when it is determined not to receive, in uplink, the DPDCH and/or the DPCCH in the current timeslot.

Based on the foregoing technical solutions, according to a position in which a current timeslot is located in a transmission interval of an SRB, it is determined, when a radio frame in which the current timeslot is located does not include the SRB or a DPCH transport block, not to send or not to receive a DPCCH and/or a DPDCH, so that power supply overheads can be reduced.

BRIEF DESCRIPTION OF THE DRAWINGS

For a more complete understanding of the present invention, and the advantages thereof, reference is now made to the following descriptions taken in conjunction with the accompanying drawings, in which.

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that, the term "and/or" in this embodiment of the present invention describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that, the technical solutions of the embodiments of the present invention may be applied to various communications systems, such as: a Global System for Mobile Communications ("GSM" for short) system, a Code Division Multiple Access ("CDMA" for short) system, a Wideband Code Division Multiple Access ("WCDMA" for short) system, a general packet radio service ("GPRS" for short), a Long Term Evolution ("LTE" for short) system, an LTE frequency division duplex ("FDD" for short) system, an LTE time division duplex ("TDD" for short), a Universal Mobile Telecommunications System ("UMTS" for short), a Worldwide Interoperability for Microwave Access ("Wi-MAX" for short) communications system, or the like.

It should further be understood that in the embodiments of the present invention, user equipment ("UE" for short) may be referred to as a terminal, a mobile station ("MS" for short), a mobile terminal, or the like. The user equipment may communicate with one or more core networks through a radio access network ("RAN" for short). For example, the user equipment may be a mobile phone (also referred to as a "cellular" phone), a computer with a mobile terminal, or the like. For example, the user equipment may also be a portable, pocket-sized, handheld, computer built-in, or in-vehicle mobile apparatus, which exchanges voice and/or data with the radio access network.

In the embodiments of the present invention, a network device may be a base station, an access point ("AP" for short), remote radio equipment ("RRE" for short), a remote radio head ("RRH" for short), a remote radio unit ("RRU" for short), a relay node ("RN" for short), or the like. The base station may be a base transceiver station ("BTS" for short) in the GSM or the CDMA, may be a NodeB ("NB" for short) in the WCDMA, or may be an evolved NodeB ("ENB or e-NodeB" for short) in the LTE. It should further be understood that, in the embodiments of the present invention, the network device may also be another device that has a scheduling function, such as UE that has a scheduling function; and the embodiments of the present invention are not limited thereto.

Figure 1:
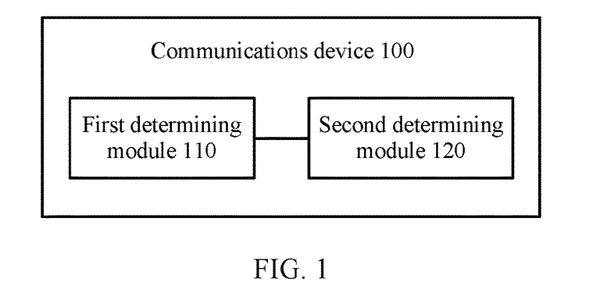
FIG. 1 is a schematic block diagram of a communications device according to an embodiment of the present invention.

FIG. 1 shows a schematic block diagram of a communications device 100 according to an embodiment of the present invention. As shown in FIG. 1, the communications device 100 includes: a first determining module 110 and a second determining module 120.

The first determining module 110 is configured to: when a dedicated channel DCH carries a signaling radio bearer SRB, determine a position in which a current timeslot (slot) is located in a transmission interval of the SRB, where the transmission interval of the SRB is greater than or equal to 40 ms.

The transmission interval of the SRB may be a transmission time interval (TTI) of the SRB, or may be a compression interval (CI) of the SRB, for example, a 40 ms compression interval may be construed as a time interval of 40 ms duration aligned in time with a 40 ms TTI. It should be noted that, the transmission interval of the SRB in this embodiment of the present invention is not limited only to being greater than or equal to 40 ms, for example, the transmission interval of the SRB may also be 20 ms.

The second determining module 120 is configured to: in a case in which the position in which the current timeslot is located meets a preset condition, when a radio frame in which the current timeslot is located does not include the SRB or a dedicated physical channel (DPCH) transport block, determine not to send or not to receive a dedicated physical control channel (DPCCH) and/or a dedicated physical data channel (DPDCH) in the current timeslot. In this application document, the DCH is a transmission channel, and the DPDCH and the DPCCH are physical channels.

In other words, in a case in which the position in which the current timeslot is located meets the preset condition, when the radio frame in which the current timeslot is located does not include the SRB or the DPCH transport block, it is determined to perform DTX or DRX in the current timeslot.

Therefore, when a position in which a current timeslot is located in a transmission interval of an SRB meets a preset requirement and when a radio frame in which the current timeslot is located does not include the SRB or a DPCH transport block, the communications device in this embodiment of the present invention determines not to send or not to receive a DPCCH and/or a DPDCH, so that power supply overheads can be reduced.

Specifically, in this embodiment of the present invention, the first determining module 110 may be configured to: when the DCH carries only the SRB, determine the position in which the current timeslot is located in the transmission interval of the SRB.

In this embodiment of the present invention, that the position in which the current timeslot is located meets a preset condition may include: the current timeslot is not in a first preset time range of the transmission interval of the SRB, where the first preset time range may be defined according to an actual requirement, and the preset time range may be less than or equal to one radio frame, for example, the preset time range may be 10 timeslots (slot). The first preset time range may also be the first radio frame of the transmission interval of the SRB; however, the present invention is not limited thereto.

In this embodiment of the present invention, how to send or receive the DPCCH and/or the DPDCH in the first preset time range is not limited. The DPCCH and/or the DPDCH can be normally sent or received in the first preset time range, and it is determined only whether DTX or DRX is performed in another time range of the transmission interval of the SRB than the first preset time range.

Alternatively, that the position in which the current timeslot is located meets a preset condition may further include: the current timeslot is in a second preset time range of the transmission interval of the SRB. For example, when the transmission interval of the SRB is 40 ms, the second preset time range may be the third radio frame of the transmission interval of the SRB; however, the present invention is not limited thereto. For example, when the transmission interval of the SRB is 80 ms, the second preset time range may be the third preset time range or the fifth preset time range of the transmission interval of the SRB, that is, the second preset time range may be the $n^{th}$ radio frame of the transmission interval of the SRB, where n may be an odd number greater than or equal to 3. It should be noted that in this embodiment of the present invention, it is determined whether to perform DTX or DRX in the preset time range, regardless of how to send or receive the DPCCH and/or the DPDCH in the another time range of the transmission interval of the SRB.

Alternatively, the first determining module 110 and the second determining module 120 may be a same module or different modules, and details are not described herein again.

Figure 2:
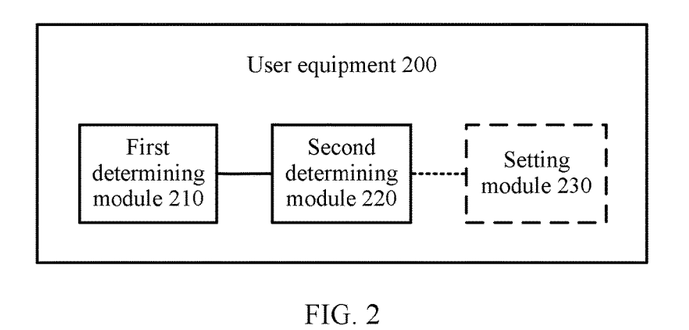
FIG. 2 is a schematic block diagram of user equipment according to an embodiment of the present invention.

FIG. 2 shows user equipment 200 according to an embodiment of the present invention. The user equipment 200 is an example of the communications device 100, and repeated description is appropriately omitted. As shown in FIG. 2, the user equipment 200 includes: a first determining module 210 and a second determining module 220.

The first determining module 210 is configured to: when a dedicated channel DCH carries a signaling radio bearer SRB, determine a position in which a current timeslot is located in a transmission interval of the SRB, where the transmission interval of the SRB is greater than or equal to 40 ms.

The second determining module 220 is configured to: in a case in which the position in which the current timeslot is located meets a preset condition, when a radio frame in which the current timeslot is located does not include the SRB or a DPCH transport block, determine not to send, in uplink, or not to receive, in downlink, a DPDCH and/or a DPCCH in the current timeslot.

In this embodiment of the present invention, the UE does not send, in uplink, the DPDCH and/or the DPCCH, that is, the UE performs uplink DTX, and does not send the DPDCH and/or the DPCCH to a network device, which can reduce power supply overheads consumed by the UE, and can reduce inter-UE interference. The UE does not receive, in downlink, the DPDCH and/or the DPCCH, that is, the UE performs downlink DRX, which can reduce power supply overheads consumed by the UE.

Specifically, in this embodiment of the present invention, the first determining module 210 may be configured to: when the DCH carries only the SRB, determine the position in which the current timeslot is located in the transmission interval of the SRB.

Optionally, in this embodiment of the present invention, as shown in FIG. 2, the UE 200 may further include a setting module 230, configured to: when it is determined not to send, in uplink, the DPDCH and/or the DPCCH in the current timeslot, set a parameter UL_DPCH_DYN_DTX to TRUE in the current timeslot; or when it is determined not to receive, in downlink, the DPDCH and/or the DPCCH in the current timeslot, set a parameter DL_DPCH_DYN_DRX to TRUE in the current timeslot.

It should be noted that, in this embodiment of the present invention, the second determining module 220 may further be configured to: when the radio frame in which the current timeslot is located includes the SRB or the DPCH transport block, determine to send, in uplink, or to receive, in downlink, the DPCCH and/or the DPDCH in the current timeslot.

Optionally, the setting module 230 may further be configured to: when it is determined to send, in uplink, the DPDCH and/or the DPCCH in the current timeslot, set a parameter UL_DPCH_DYN_DTX to FALSE in the current timeslot; or when it is determined to receive, in downlink, the DPDCH and/or the DPCCH in the current timeslot, set a parameter DL_DPCH_DYN_DRX to FALSE in the current timeslot.

Figure 4:
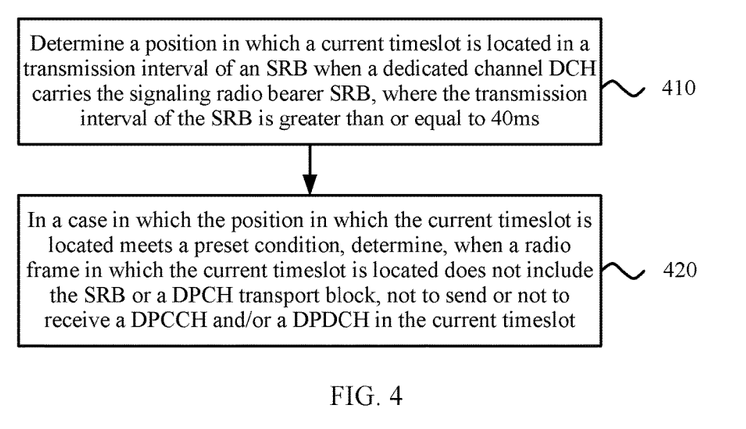
FIG. 4 is a schematic flowchart of a discontinuous transmission method according to an embodiment of the present invention.

It should be understood that the user equipment 200 according to this embodiment of the present invention may be corresponding to user equipment in a discontinuous transmission method 400 in an embodiment of the present invention, and the foregoing and other operations and/or functions of the modules of the user equipment 200 are respectively used to implement corresponding procedures of the method in FIG. 4. For brevity, details are not described herein again.

Alternatively, the first determining module 210 and the second determining module 220 may be a same module or different modules, and details are not described herein again.

Figure 3:
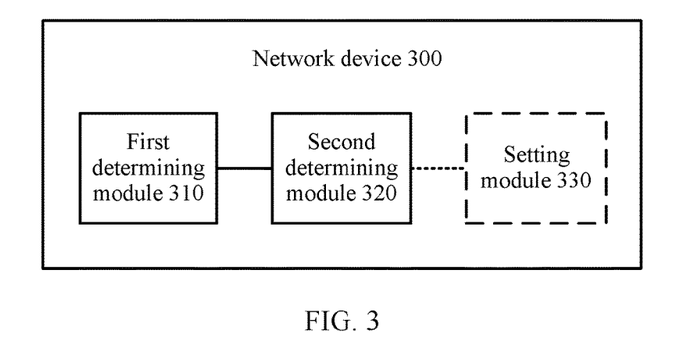
FIG. 3 is a schematic block diagram of a network device according to an embodiment of the present invention.

FIG. 3 shows a network device 300 according to an embodiment of the present invention. The network device 300 is another example of a communications device 100, and repeated description is appropriately omitted. As shown in FIG. 3, the network device 300 includes: a first determining module 310 and a second determining module 320.

The first determining module 310 is configured to: when a dedicated channel DCH carries a signaling radio bearer SRB, determine a position in which a current timeslot is located in a transmission interval of the SRB, where the transmission interval of the SRB is greater than or equal to 40 ms.

The second determining module 320 is configured to: in a case in which the position in which the current timeslot is located meets a preset condition, when a radio frame in which the current timeslot is located does not include the SRB or a DPCH transport block, determine not to send, in downlink, or not to receive, in uplink, a DPDCH and/or a DPCCH in the current timeslot.

In this embodiment of the present invention, the network device does not send, in downlink, the DPDCH and/or the DPCCH, that is, the network device performs downlink DTX, and does not send the DPDCH and/or the DPCCH to UE, which can reduce power supply overloads consumed by the network device. The network device does not receive, in uplink, the DPDCH and/or the DPCCH, that is, the network device performs uplink DRX, which can reduce power supply overheads consumed by the network device.

Specifically, in this embodiment of the present invention, the first determining module 310 may be configured to: when the DCH carries only the SRB, determine the position in which the current timeslot is located in the transmission interval of the SRB.

Optionally, in this embodiment of the present invention, as shown in FIG. 3, the network device 300 may further include a setting module 330, configured to: when it is determined not to send, in downlink, the DPDCH and/or the DPCCH in the current timeslot, set a parameter DL_DPCH_DYN_DRX to TRUE in the current timeslot; or when it is determined not to receive, in uplink, the DPDCH and/or the DPCCH in the current timeslot, set a parameter UL_DPCH_DYN_DTX to TRUE in the current timeslot.

It should be noted that, in this embodiment of the present invention, the second determining module 320 may further be configured to: when the radio frame in which the current timeslot is located includes the SRB or the DPCH transport block, determine to send, in downlink, or to receive, in uplink, the DPCCH and/or the DPDCH in the current timeslot.

Optionally, the setting module 330 may further be configured to: when the second determining module 320 determines to send, in downlink, the DPDCH and/or the DPCCH in the current timeslot, set a parameter DL_DPCH_DYN_DRX to FALSE in the current timeslot; or when the second determining module 320 determines to receive, in uplink, the DPDCH and/or the DPCCH in the current timeslot, set a parameter UL_DPCH_DYN_DTX to FALSE in the current timeslot.

It should be understood that the network device 300 according to this embodiment of the present invention may be corresponding to a network device in a discontinuous transmission method 400 in an embodiment of the present invention, and the foregoing and other operations and/or functions of the modules of the network device 300 are respectively used to implement corresponding procedures of the method in FIG. 4. For brevity, details are not described herein again.

Alternatively, the first determining module 310 and the second determining module 320 may be a same module or different modules, and details are not described herein again.

It should be noted that, during communication between the UE and the network device, when the UE performs uplink DTX, correspondingly, the network device performs downlink DRX; when the UE performs downlink DRX, correspondingly, the network device performs uplink DTX.

FIG. 4 is a schematic flowchart of a discontinuous transmission method 400 according to an embodiment of the present invention. The method 400 is applied to a network in which a DCH carries an SRB. The method 400 may be performed by user equipment UE, or may be performed by a network device. As shown in FIG. 4, the method 400 includes the following content:

410. Determine a position in which a current timeslot (slot) is located in a transmission interval of an SRB when a dedicated channel DCH carries the signaling radio bearer SRB, where the transmission interval of the SRB is greater than or equal to 40 ms.

The transmission interval of the SRB may be a transmission time interval (TTI) of the SRB, or may be a compression interval (CI) of the SRB, for example, a 40 ms compression interval may be construed as a time interval of 40 ms duration aligned in time with a 40 ms TTI. It should be noted that, the transmission interval of the SRB in this embodiment of the present invention is not limited to being greater than or equal to 40 ms, for example, the transmission interval of the SRB may also be 20 ms.

420. In a case in which the position in which the current timeslot is located meets a preset condition, determine, when a radio frame in which the current timeslot is located does not include the SRB or a DPCH transport block, not to send or not to receive a dedicated physical control channel DPCCH and/or a dedicated physical data channel DPDCH in the current timeslot.

In other words, in a case in which the position in which the current timeslot is located meets the preset condition, when the radio frame in which the current timeslot is located does not include the SRB or the DPCH transport block, it is determined to perform DTX or DRX in the current timeslot.

Therefore, in the discontinuous transmission method in this embodiment of the present invention, according to a position in which a current timeslot is located in a transmission interval of an SRB, it is determined, when a radio frame in which the current timeslot is located does not include the SRB or a DPCH transport block, not to send or not to receive a DPCCH and/or a DPDCH, so that power supply overheads can be reduced.

Specifically, in this embodiment of the present invention, 410 may include: determining the position in which the current timeslot is located in the transmission interval of the SRB when the DCH carries only the SRB.

In this embodiment of the present invention, that the position in which the current timeslot is located meets a preset condition may include: the current timeslot is not in a first preset time range of the transmission interval of the SRB, where the first preset time range may be defined according to an actual requirement, and the preset time range may be less than or equal to one radio frame, for example, the preset time range may be 10 timeslots (slot). The first preset time range may also be the first radio frame of the transmission interval of the SRB; however, the present invention is not limited thereto.

In this embodiment of the present invention, how to send or receive the DPCCH and/or the DPDCH in the first preset time range is not limited. The DPCCH and/or the DPDCH can be normally sent or received in the first preset time range, and it is determined only whether DTX or DRX is performed in another time range of the transmission interval of the SRB than the first preset time range.

Alternatively, that the position in which the current timeslot is located meets a preset condition may further include: the current timeslot is in a second preset time range of the transmission interval of the SRB. For example, when the transmission interval of the SRB is 40 ms, the second preset time range may be the third radio frame of the transmission interval of the SRB; however, the present invention is not limited thereto. For example, when the transmission interval of the SRB is 80 ms, the second preset time range may be the third preset time range or the fifth preset time range of the transmission interval of the SRB, that is, the second preset time range may be the $n^{th}$ radio frame of the transmission interval of the SRB, where n may be an odd number greater than or equal to 3. It should be noted that in this embodiment of the present invention, it is determined whether to perform DTX or DRX in the preset time range, regardless of how to send or receive the DPCCH and/or the DPDCH in the another time range of the transmission interval of the SRB.

In this embodiment of the present invention, the method 400 is performed by the UE; and 420 may include: determining, when the radio frame in which the current timeslot is located does not include the SRB or the DPCH transport block, not to send, in uplink, or not to receive, in downlink, the DPDCH and/or the DPCCH in the current timeslot.

Specifically, the UE does not send, in uplink, the DPDCH and/or the DPCCH, that is, the UE performs uplink DTX, and does not send the DPDCH and/or the DPCCH to the network device, which can reduce power supply overheads consumed by the UE, and can reduce inter-UE interference. The UE does not receive, in downlink, the DPDCH and/or the DPCCH, that is, the UE performs downlink DRX, which can reduce power supply overheads consumed by the UE.

Optionally, in this embodiment of the present invention, when it is determined not to send, in uplink, the DPDCH and/or the DPCCH in the current timeslot, the UE may set a parameter UL_DPCH_DYN_DTX to TRUE in the current timeslot; or when it is determined not to receive, in downlink, the DPDCH and/or the DPCCH in the current timeslot, the UE may set a parameter DL_DPCH_DYN_DRX to TRUE in the current timeslot.

It should be noted that, in this embodiment of the present invention, when the radio frame in which the current timeslot is located includes the SRB or the DPCH transport block, the UE may determine to send, in uplink, or to receive, in downlink, the DPCCH and/or the DPDCH in the current timeslot. For example, the UE may send, in uplink, the DPCCH and/or the DPDCH to the network device, and receive, in downlink, the DPCCH and/or the DPDCH sent by the network device.

Optionally, when it is determined to send, in uplink, the DPDCH and/or the DPCCH in the current timeslot, the UE may set a parameter UL_DPCH_DYN_DTX to FALSE in the current timeslot; or when it is determined to receive, in downlink, the DPDCH and/or the DPCCH in the current timeslot, the UE may set a parameter DL_DPCH_DYN_DRX to FALSE in the current timeslot.

In another embodiment of the present invention, the method 400 is performed by the network device; and 420 may include: determining, when the radio frame in which the current timeslot is located does not include the SRB or the DPCH transport block, not to send, in downlink, or not to receive, in uplink, the DPDCH and/or the DPCCH in the current timeslot.

Specifically, the network device does not send, in downlink, the DPDCH and/or the DPCCH, that is, the network device performs downlink DTX, and does not send the DPDCH and/or the DPCCH to the UE, which can reduce power supply overheads consumed by the network device, and reduce transmit power of the network device. The network device does not receive, in uplink, the DPDCH and/or the DPCCH, that is, the network device performs uplink DRX, which can reduce power supply overheads consumed by the network device.

Optionally, in this embodiment of the present invention, when it is determined not to send, in downlink, the DPDCH and/or the DPCCH, the network device may set a parameter DL_DPCH_DYN_DRX to TRUE in the current timeslot; when it is determined not to receive, in uplink, the DPDCH and/or the DPCCH, the network device may set a parameter UL_DPCH_DYN_DTX to TRUE in the current timeslot.

It should be noted that, in this embodiment of the present invention, when the radio frame in which the current timeslot is located includes the SRB or the DPCH transport block, the network device may determine to send, in downlink, or to receive, in uplink, the DPCCH and/or the DPDCH in the current timeslot. For example, the network device may send, in downlink, the DPCCH and/or the DPDCH to the UE, and receive, in uplink, the DPCCH and/or the DPDCH sent by the UE.

Optionally, when it is determined to send, in downlink, the DPDCH and/or the DPCCH in the current timeslot, the network device may set a parameter DL_DPCH_DYN_DRX to FALSE in the current timeslot; or when it is determined to receive, in uplink, the DPDCH and/or the DPCCH in the current timeslot, the network device may set a parameter UL_DPCH_DYN_DTX to FALSE in the current timeslot.

It should be noted that, during communication between the UE and the network device, when the UE performs uplink DTX, correspondingly, the network device performs uplink DRX; when the network device performs downlink DTX, correspondingly, the UE performs downlink DRX.

The following describes the discontinuous transmission method 400 according to the embodiments of the present invention in detail with reference to Embodiment 1 and Embodiment 2. The following description is based on an example in which the method 400 is performed by UE. In the following, that a transmission interval of an SRB is 40 ms is used as an example for description; however, the present invention is not limited thereto.

Embodiment 1

For a current uplink timeslot, UE does not send, in uplink, a DPDCH and/or a DPCCH in the current timeslot, or sets a parameter UL_DPCH_DYN_DTX to TRUE if the following two conditions are both met: the current timeslot is not in the first radio frame in a 40 ms transmission interval of an SRB; and a radio frame in which an uplink DCH is located in the current timeslot does not include the SRB, or a radio frame in which an uplink DCH is located in the current timeslot does not include a DPCH transport block. If the foregoing two conditions are not met, the UE performs uplink transmission or sets a parameter UL_DPCH_DYN_DTX to FALSE.

For a current downlink timeslot, UE does not receive, in downlink, a DPDCH and/or a DPCCH in the current timeslot, or sets a parameter DL_DPCH_DYN_DRX to TRUE if the following two conditions are both met: the current timeslot is not in the first radio frame in a 40 ms transmission interval of an SRB; and a radio frame in which a downlink DCH is located in the current timeslot does not include the SRB, or a radio frame in which a downlink DCH is located in the current timeslot does not include a DPCH transport block. If the foregoing two conditions are not met, the UE performs downlink receiving or sets a parameter DL_DPCH_DYN_DRX to FALSE.

In this embodiment of the present invention, in a case in which UE does not transmit an SRB, that is, the UE transmits the SRB only in the first radio frame in a transmission interval of the SRB and performs DTX or DRX in three remaining radio frames, a probability of maximum DTX or maximum DRX is 75% (that is, a probability of DTX or DRX is 75%), which can improve efficiency of DTX or DRX, so that power consumption of the UE can be significantly reduced, and inter-UE interference can be reduced.

Embodiment 2

For a current uplink timeslot, UE does not send, in uplink, a DPDCH and/or a DPCCH in the current timeslot, or sets a parameter UL_DPCH_DYN_DTX to TRUE if the following conditions are both met: the current timeslot is in the third radio frame in a 40 ms transmission interval of an SRB; and a radio frame in which an uplink DCH is located in the current timeslot does not include the SRB, or a radio frame in which an uplink DCH is located in the current timeslot does not include a DPCH transport block. If the foregoing two conditions are not met, the UE performs uplink transmission or sets a parameter UL_DPCH_DYN_DTX to FALSE.

For a current downlink timeslot, UE does not receive, in downlink, a DPDCH and/or a DPCCH in the current timeslot, or sets a parameter DL_DPCH_DYN_DRX to TRUE if the following conditions are both met: the current timeslot is in the third radio frame in a 40 ms transmission interval of an SRB; and a radio frame in which a downlink DCH is located in the current timeslot does not include the SRB, or a radio frame in which a downlink DCH is located in the current timeslot does not include a DPCH transport block. If the foregoing two conditions are not met, the UE performs downlink receiving or sets a parameter DL_DPCH_DYN_DRX to FALSE.

In this embodiment of the present invention, in a case in which the UE does not transmit the SRB, the UE performs DTX or DRX in the third radio frame in the transmission interval of the SRB. This embodiment of the present invention is compatible with the prior art, and can further improve efficiency of the DTX or the DRX. For example, 3GPP Release 12 defines that DTX or DRX is performed in the second radio frame in a 20 ms transmission interval of an SRB. Direct application of DTX and DRX technologies of Release 12 to a 40 ms transmission interval of the SRB is equivalent to that DTX or DRX is performed in the second radio frame and the fourth radio frame of the 40 ms transmission interval of the SRB, and DTX and/or DRX are/is not supported in the third radio frame. When the discontinuous transmission method in this embodiment of the present invention is combined with the technologies of Release 12, DTX or DRX can be performed in the third radio frame of the 40 ms transmission interval of the SRB, which, compared with the technologies of Release 12, can further reduce power supply overheads consumed by the UE and further reduce inter-UE interference.

Figure 5:
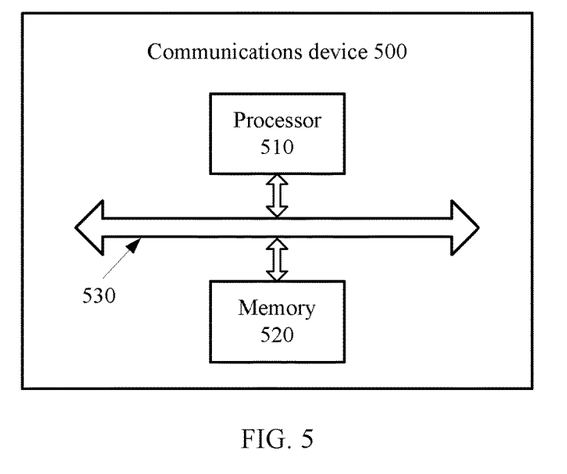
FIG. 5 is a schematic block diagram of a communications device according to another embodiment of the present invention.

FIG. 5 shows a schematic block diagram of a communications device 500 according to another embodiment of the present invention. As shown in FIG. 5, the communications device 500 includes: a processor 510, a memory 520, and a bus system 530, where the processor 510 and the memory 520 are connected to each other by using the bus system 530, the memory 520 is configured to store an instruction, and the processor 510 is configured to execute the instruction stored by the memory 520.

The processor 510 is configured to: when a dedicated channel DCH carries a signaling radio bearer SRB, determine a position in which a current timeslot (slot) is located in a transmission interval of the SRB, where the transmission interval of the SRB is greater than or equal to 40 ms; and in a case in which the position in which the current timeslot is located meets a preset condition, when a radio frame in which the current timeslot is located does not include the SRB or a DPCH transport block, determine not to send or not to receive a dedicated physical control channel DPCCH and/or a dedicated physical data channel DPDCH in the current timeslot.

Therefore, according to a position in which a current timeslot is located in a transmission interval of an SRB, the communications device in this embodiment of the present invention determines, when a radio frame in which the current timeslot is located does not include the SRB or a DPCH transport block, not to send or not to receive a DPCCH and/or a DPDCH, so that power supply overheads can be reduced, and communication interference can be reduced.

It should be understood that in this embodiment of the present invention, the processor 510 may be a central processing unit (CPU), or the processor 510 may be another general-purpose processor, a digital signal processor (DSP), an application-specific integrated circuit (ASIC), a field programmable gate array (FPGA) or another programmable logic device, a discrete gate or transistor logic device, a discrete hardware assembly, or the like. The general-purpose processor may be a microprocessor, or the processor may be any conventional processor, or the like.

The memory 520 may include a read-only memory and a random access memory, and provides an instruction and data for the processor 510. A part of the memory 520 may further include a nonvolatile random access memory. For example, the memory 520 may further store information about a device type.

In addition to a data bus, the bus system 530 may further include a power bus, a control bus, a status signal bus, and the like. However, for clarity of description, various buses are marked as the bus system 530 in the figure.

In an implementation process, the steps in the foregoing method may be completed by using an integrated logic circuit of hardware in the processor 510 or an instruction in a form of software. Steps of the methods disclosed with reference to the embodiments of the present invention may be directly executed and completed by a hardware processor, or may be executed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 520. The processor 510 reads information in the memory 520, and completes the steps of the foregoing method in combination with hardware of the memory 520. To avoid repetition, details are not described herein again.

In this embodiment of the present invention, the processor 510 may be specifically configured to: when the DCH carries only the SRB, determine the position in which the current timeslot (slot) is located in the transmission interval of the SRB.

In this embodiment of the present invention, that the position in which the current timeslot is located meets a preset condition may include: the current timeslot is not in a first preset time range of the transmission interval of the SRB, where the first preset time range may be defined according to an actual requirement, for example, the first preset time range may be the first radio frame of the transmission interval of the SRB; however, the present invention is not limited thereto. Alternatively, preset time range may also be less than or equal to one radio frame, for example, the preset time range may be 10 timeslots (slot).

In this embodiment of the present invention, how to send or receive the DPCCH and/or the DPDCH in the first preset time range is not limited. The DPCCH and/or the DPDCH can be normally sent or received in the first preset time range, and it is determined only whether DTX or DRX is performed in another time range of the transmission interval of the SRB than the preset time range.

Alternatively, that the position in which the current timeslot is located meets a preset condition may further include: the current timeslot is in a second preset time range of the transmission interval of the SRB. For example, when the transmission interval of the SRB is 40 ms, the second preset time range may be the third radio frame of the transmission interval of the SRB; however, the present invention is not limited thereto. For example, when the transmission interval of the SRB is 80 ms, the second preset time range may be the third preset time range or the fifth preset time range of the transmission interval of the SRB, that is, the second preset time range may be the $n^{th}$ radio frame of the transmission interval of the SRB, where n may be an odd number greater than or equal to 3. It should be noted that in this embodiment of the present invention, it is determined whether to perform DTX or DRX in the preset time range, regardless of how to send or receive the DPCCH and/or the DPDCH in the another time range of the transmission interval of the SRB.

Figure 6:
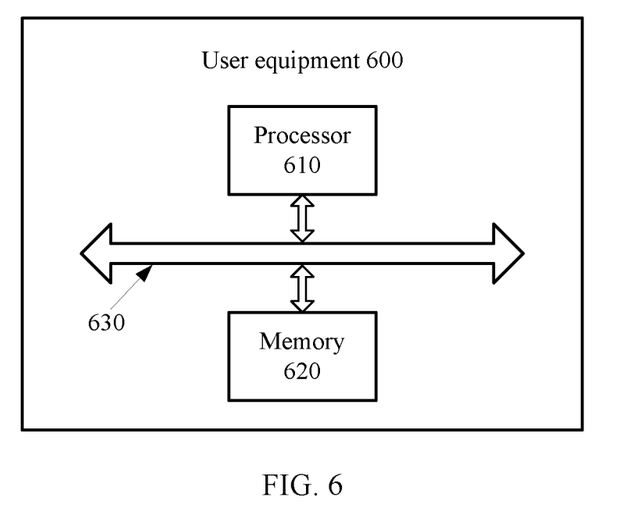
FIG. 6 is a schematic block diagram of user equipment according to another embodiment of the present invention.

FIG. 6 shows a schematic block diagram of user equipment 600 according to another embodiment of the present invention. The user equipment 600 is an example of the communications device 500, and repeated description is appropriately omitted. As shown in FIG. 6, the user equipment 600 includes: a processor 610, a memory 620, and a bus system 630, where functions of the processor 610, the memory 620, and the bus system 630 are the same as those of the processor 510, the memory 520, and the bus system 530 in the communications device 500, and details are not described herein again.

In this embodiment of the present invention, the processor 610 is configured to: when a dedicated channel DCH carries a signaling radio bearer SRB, determine a position in which a current timeslot is located in a transmission interval of the SRB, where the transmission interval of the SRB is greater than or equal to 40 ms; and in a case in which the position in which the current timeslot is located meets a preset condition, when a radio frame in which the current timeslot is located does not include the SRB or a DPCH transport block, determine not to send, in uplink, or not to receive, in downlink, a DPDCH and/or a DPCCH in the current timeslot.

Therefore, according to a position in which a current timeslot is located in a transmission interval of an SRB and information carried by a radio frame in which the current timeslot is located, the user equipment in this embodiment of the present invention determines, when the radio frame in which the current timeslot is located does not include the SRB or a DPCH transport block, not to send, in uplink, or not to receive, in downlink, a DPCCH and/or a DPDCH, so that power supply overheads can be reduced, and communication interference can be reduced.

Specifically, the processor 610 may be configured to: when the DCH carries only the SRB, determine the position in which the current timeslot is located in the transmission interval of the SRB.

Optionally, in this embodiment of the present invention, the processor 610 may further be configured to: when it is determined not to send, in uplink, the DPDCH and/or the DPCCH in the current timeslot, set a parameter UL_DPCH_DYN_DTX to TRUE in the current timeslot; or when it is determined not to receive, in downlink, the DPDCH and/or the DPCCH in the current timeslot, set a parameter DL_DPCH_DYN_DRX to TRUE in the current timeslot.

It should be noted that, in this embodiment of the present invention, the processor 610 may further be configured to: when the radio frame in which the current timeslot is located includes the SRB or the DPCH transport block, determine to send, in uplink, or to receive, in downlink, the DPCCH and/or the DPDCH in the current timeslot.

Optionally, the processor 610 may further be configured to: when it is determined to send, in uplink, the DPDCH and/or the DPCCH in the current timeslot, set a parameter UL_DPCH_DYN_DTX to FALSE in the current timeslot; or when it is determined to receive, in downlink, the DPDCH and/or the DPCCH in the current timeslot, set a parameter DL_DPCH_DYN_DRX to FALSE in the current timeslot.

It should be understood that the user equipment 600 according to this embodiment of the present invention may be corresponding to the user equipment in the discontinuous transmission method 400 according to the embodiment of the present invention and the user equipment 200 according to the embodiment of the present invention, and the foregoing and other operations and/or functions of the modules of the user equipment 600 are respectively used to implement corresponding procedures of the method 400 in FIG. 4. For brevity, details are not described herein again.

Figure 7:
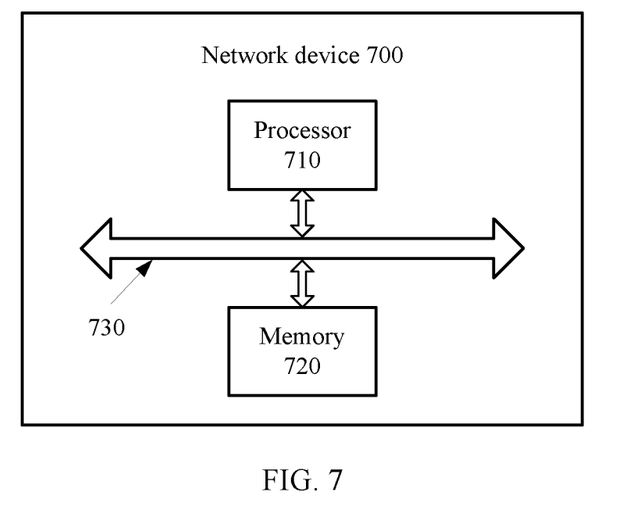
FIG. 7 is a schematic block diagram of a network device according to another embodiment of the present invention.

FIG. 7 shows a schematic block diagram of a network device 700 according to another embodiment of the present invention. The network device 700 is an example of the communications device 500, and repeated description is appropriately omitted. As shown in FIG. 7, the network device includes: a processor 710, a memory 720, and a bus system 730, where functions of the processor 710, the memory 720, and the bus system 730 are the same as those of the processor 510, the memory 520, and the bus system 530 in the communications device 500, and details are not described herein again.

The processor 710 is configured to: when a dedicated channel DCH carries a signaling radio bearer SRB, determine a position in which a current timeslot is located in a transmission interval of the SRB, where the transmission interval of the SRB is greater than or equal to 40 ms; and in a case in which the position in which the current timeslot is located meets a preset condition, when a radio frame in which the current timeslot is located does not include the SRB or a DPCH transport block, determine not to send, in downlink, or not to receive, in uplink, a DPDCH and/or a DPCCH in the current timeslot.

Therefore, according to a position in which a current timeslot is located in a transmission interval of an SRB, the network device in this embodiment of the present invention determines, when a radio frame in which the current timeslot is located does not include the SRB or a DPCH transport block, not to send, in downlink, or not to receive, in uplink, a DPCCH and/or a DPDCH, so that power supply overheads can be reduced.

Specifically, the processor 710 may be configured to: when the DCH carries only the SRB, determine the position in which the current timeslot is located in the transmission interval of the SRB.

Optionally, in this embodiment of the present invention, the processor 710 may further be configured to: when it is determined not to send, in downlink, the DPDCH and/or the DPCCH, set a parameter DL_DPCH_DYN_DRX to TRUE in the current timeslot; or when it is determined not to receive, in uplink, the DPDCH and/or the DPCCH, set a parameter UL_DPCH_DYN_DTX to TRUE in the current timeslot.

It should be noted that, in this embodiment of the present invention, the processor 710 may further be configured to: when the radio frame in which the current timeslot is located includes the SRB or the DPCH transport block, determine to send, in downlink, or to receive, in uplink, the DPCCH and/or the DPDCH in the current timeslot.

Optionally, the processor 710 may further be configured to: when it is determined to send, in downlink, the DPDCH and/or the DPCCH in the current timeslot, set a parameter DL_DPCH_DYN_DRX to FALSE in the current timeslot; or when it is determined to receive, in uplink, the DPDCH and/or the DPCCH in the current timeslot, set a parameter UL_DPCH_DYN_DTX to FALSE in the current timeslot.

It should be understood that the network device 700 according to this embodiment of the present invention may be corresponding to the network device in the discontinuous transmission method 400 according to the embodiment of the present invention and the network device 300 according to the embodiment of the present invention, and the foregoing and other operations and/or functions of the modules of the network device 700 are respectively used to implement corresponding procedures of the method 400 in FIG. 4, and for brevity, details are not described herein again.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a portable hard disk, a read-only memory (ROM), a random access memory (RAM), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A device, comprising:
   a processor and a non-transitory computer readable storage medium storing a program for execution by the processor, the program including instructions for:
      when a dedicated channel (DCH) carries a signaling radio bearer (SRB), determining a position in which a current timeslot is located, wherein the position in which the current timeslot is located indicates where in a transmission interval of the SRB the current timeslot is located, and wherein the transmission interval of the SRB is equal to 40 ms;
      determining whether the position in which the current timeslot is located is within a preset time range of the transmission interval; and
      in response to the position in which the current timeslot is located being within the preset time range of the transmission interval, and in response to a radio frame in which the current timeslot is located not comprising the SRB or a dedicated physical channel (DPCH) transport block, determining not to send or not to receive a dedicated physical data channel (DPDCH) in the current timeslot.

2. The device according to claim 1, wherein determining the position in which the current timeslot is located comprises:
   determining the position in which the current timeslot is located when the DCH carries only the SRB.

3. The device according to claim 1, wherein the position in which the current timeslot is located being within the preset time range of the transmission interval comprises:
   the current timeslot being not in a first preset time range of the transmission interval of the SRB, wherein the first preset time range is equal to one radio frame.

4. The device according to claim 3, wherein the first preset time range is a first radio frame of the transmission interval of the SRB.

5. The device according to claim 1, wherein the position in which the current timeslot is located being within the preset time range of the transmission interval comprises:
   the current timeslot being in a second preset time range of the transmission interval of the SRB.

6. The device according to claim 5, wherein the second preset time range is a third radio frame of the transmission interval of the SRB.

7. The device according to claim 1, wherein the device is user equipment; and
   wherein determining not to send or not to receive the DPDCH in the current timeslot when the radio frame in which the current timeslot is located does not comprise the SRB or a DPCH transport block comprises:
      determining not to send, in uplink, or not to receive, in downlink, the DPDCH in the current timeslot when the radio frame in which the current timeslot is located does not comprise the SRB or the DPCH transport block.

8. The device according to claim 7, wherein the program further includes instructions for:
   setting a parameter UL_DPCH_DYN_DTX to TRUE in the current timeslot when it is determined not to send, in uplink, the DPDCH in the current timeslot; or setting a parameter DL_DPCH_DYN_DRX to TRUE in the current timeslot when it is determined not to receive, in downlink, the DPDCH in the current timeslot.

9. The device according to claim 1, wherein the device is a network device; and
wherein determining not to send or not to receive the DPDCH in the current timeslot when the radio frame in which the current timeslot is located does not comprise the SRB or the DPCH transport block comprises:
determining not to send, in downlink, or not to receive, in uplink, the DPDCH in the current timeslot when the radio frame in which the current timeslot is located does not comprise the SRB or the DPCH transport block.

10. The device according to claim 9, wherein the program further includes instructions for:
setting a parameter DL_DPCH_DYN_DRX to TRUE in the current timeslot when it is determined not to send, in downlink, the DPDCH in the current timeslot; or
setting a parameter UL_DPCH_DYN_DTX to TRUE in the current timeslot when it is determined not to receive, in uplink, the DPDCH in the current timeslot.

11. A method, comprising:
when a dedicated channel (DCH) carries a signaling radio bearer (SRB), determining, by a device, a position in which a current timeslot is located, wherein the position in which the current timeslot is located indicates where in a transmission interval of the SRB the current timeslot is located, wherein the transmission interval of the SRB is equal to 40 ms;
determining, by the device, whether the position in which the current timeslot is located is within a preset time range of the transmission interval; and
in response to the position in which the current timeslot is located being within the preset time range of the transmission interval, and in response to a radio frame in which the current timeslot is located not comprising the SRB or a dedicated physical channel (DPCH) transport block, determining, by the device, not to send or not to receive a dedicated physical data channel (DPDCH) in the current timeslot.

12. The method according to claim 11, wherein determining the position in which the current timeslot is located comprises:
determining the position in which the current timeslot is located when the DCH carries only the SRB.

13. The method according to claim 11, wherein the position in which the current timeslot is located being within the preset time range of the transmission interval comprises:
the current timeslot being not in a first preset time range of the transmission interval of the SRB, wherein the first preset time range is equal to one radio frame.

14. The method according to claim 13, wherein the first preset time range is a first radio frame of the transmission interval of the SRB.

15. The method according to claim 11, wherein the position in which the current timeslot is located being within the preset time range of the transmission interval comprises:
the current timeslot being in a second preset time range of the transmission interval of the SRB.

16. The method according to claim 15, wherein the second preset time range is a third radio frame of the transmission interval of the SRB.

17. The method according to claim 11, wherein the method is performed by user equipment (UE), and wherein determining not to send or not to receive t the DPDCH in the current timeslot when the radio frame in which the current timeslot is located does not comprise the SRB or a DPCH transport block comprises:
determining not to send, in uplink, or not to receive, in downlink, the DPDCH in the current timeslot when the radio frame in which the current timeslot is located does not comprise the SRB or the DPCH transport block.

18. The method according to claim 17, further comprising:
setting a parameter UL_DPCH_DYN_DTX to TRUE in the current timeslot when it is determined not to send, in uplink, the DPDCH in the current timeslot; or
setting a parameter DL_DPCH_DYN_DRX to TRUE in the current timeslot when it is determined not to receive, in downlink, the DPDCH in the current timeslot.

19. The method according to claim 11, wherein the method is performed by a network device, and wherein determining not to send or not to receive the DPDCH in the current timeslot when the radio frame in which the current timeslot is located does not comprise the SRB or the DPCH transport block comprises:
determining not to send, in downlink, or not to receive, in uplink, the DPDCH in the current timeslot when the radio frame in which the current timeslot is located does not comprise the SRB or the DPCH transport block.

20. The method according to claim 19, further comprising:
setting a parameter DL_DPCH_DYN_DRX to TRUE in the current timeslot when it is determined not to send, in downlink, the DPDCH empty in the current timeslot; or
setting a parameter UL_DPCH_DYN_DTX to TRUE in the current timeslot when it is determined not to receive, in uplink, the DPDCH in the current timeslot.

* * * * *

UNITED STATES PATENT AND TRADEMARK OFFICE
CERTIFICATE OF CORRECTION

PATENT NO. : 10,264,577 B2
APPLICATION NO. : 15/467704
DATED : April 16, 2019
INVENTOR(S) : Fan Wang et al.

Page 1 of 1

It is certified that error appears in the above-identified patent and that said Letters Patent is hereby corrected as shown below:

On the Title Page

Preceding "(*) Notice:", insert:
--(73) Assignee: Huawei Technologies Co., Ltd., Shenzhen (CN)--.

Signed and Sealed this
Sixteenth Day of July, 2019

Andrei Iancu
*Director of the United States Patent and Trademark Office*